United States Patent
Hong et al.

(10) Patent No.: US 7,298,675 B2
(45) Date of Patent: Nov. 20, 2007

(54) MULTILAYER RECORDING MEDIUM AND OPTICAL PICKUP FOR RECORDING AND/OR REPRODUCING THE SAME

(75) Inventors: Tao Hong, Suwon-si (KR); Tae-kyung Kim, Seoul (KR); Chong-sam Chung, Hwaseong-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 51 days.

(21) Appl. No.: 11/227,912

(22) Filed: Sep. 16, 2005

(65) Prior Publication Data

US 2006/0227678 A1    Oct. 12, 2006

(30) Foreign Application Priority Data

Apr. 11, 2005    (KR) .................. 10-2005-0029956

(51) Int. Cl.
*G11B 7/00*    (2006.01)
(52) U.S. Cl. .................. 369/44.37; 369/44.35; 369/44.41; 369/120
(58) Field of Classification Search .. 369/44.35–44.36, 369/44.28, 44.37, 47.21, 124.1–124.12, 44.21, 369/44.41, 120; 250/234
See application file for complete search history.

(56) References Cited

U.S. PATENT DOCUMENTS

| | | | | |
|---|---|---|---|---|
| 5,416,766 A | * | 5/1995 | Horimai | ..................... 369/116 |
| 5,923,632 A | * | 7/1999 | Kato et al. | ............. 369/112.07 |
| 6,392,965 B1 | | 5/2002 | Ueyama | |
| 6,654,323 B2 | * | 11/2003 | Takasaki et al. | ......... 369/44.41 |
| 6,687,201 B2 | | 2/2004 | Ma et al. | |
| 2002/0006088 A1 | * | 1/2002 | Ma et al. | .................. 369/44.28 |
| 2002/0034108 A1 | * | 3/2002 | Ogasawara et al. | ......... 365/200 |
| 2004/0202093 A1 | * | 10/2004 | Ma et al. | ............... 369/124.14 |

FOREIGN PATENT DOCUMENTS

| | | |
|---|---|---|
| CN | 1142276 | 2/1997 |
| JP | 2000-57592 | 2/2000 |

OTHER PUBLICATIONS

Office Action issued in Korean Patent Application No. 2005-29956 issued on Jul. 27, 2006.
Office Action issued in Chinese Patent Application No. 200510123714.2 on Mar. 30, 2007.

* cited by examiner

*Primary Examiner*—Thanh X. Luu
*Assistant Examiner*—Francis M. LeGasse, Jr.
(74) *Attorney, Agent, or Firm*—Stein, McEwen & Bui, LLP

(57) ABSTRACT

An optical pickup for recording and/or reproducing data with respect to a multilayer recording medium having a plurality of recording layers, where the optical pickup includes a light source emitting a beam having a predetermined wavelength, a diffraction unit separating the beam emitted from the light source into a main beam and a sub-beam, and a photodetector having a main photodetector detecting a main beam reflected from the multilayer recording medium and a sub-photodetector detecting the sub-beam. In the optical pickup, the main photodetector and sub-photodetector are separated a predetermined distance from each other so that a beam spot formed by the beam reflected from a defocus recording layer is not detected by the sub-photodetector.

18 Claims, 8 Drawing Sheets

MULTILAYER RECORDING MEDIUM AND OPTICAL PICKUP FOR RECORDING AND/OR REPRODUCING THE SAME

CROSS-REFERENCE TO RELATED APPLICATION

This application claims the benefit of Korean Patent Application No. 2005-29956, filed on Apr. 11, 2005 in the Korean Intellectual Property Office, the disclosure of which is incorporated herein in its entirety by reference.

BACKGROUND OF THE INVENTION

1. Field of the Invention

An aspect of the present invention relates to an optical pickup, and more particularly, to an optical pickup which can prevent deterioration of a tracking error signal caused by an adjacent layer during the recording and/or reproduction of a predetermined data with respect to a multilayer recording medium having a plurality of recording layers.

2. Description of the Related Art

Recently, many studies have been performed to increase the information storage capacity of an optical disk. A recording medium having a multilayer structure in which a plurality of layers are provided has been suggested as a method to increase the information storage capacity of an optical disk. For example, a DVD format in which two recording layers are spaced with an interval of about 55 μm has been adopted as a standard. A Blu-ray disk, one of next generation recording media, has a double layer structure, each layer having about 25 GB storage capacity, and uses a blue-violet laser diode and an objective lens having a 0.85 NA (numerical aperture). The multilayer recording medium with two or more recording layers can increase storage capacity in proportion to the number of recording layers.

A differential push-pull (DPP) method has been widely known as one of several tracking methods for an optical disk. The DPP method is widely adopted in an optical disk system because the method can remove an offset of a push-pull signal due to the shift of an objective lens. In the DPP method, a beam is separated into three beams of the $0^{th}$ order beam (a main beam) and $\pm 1^{st}$ order beams (sub-beams) using a grating. Next, the main beam and the two sub-beams are emitted onto the optical disk and a photodetector detects a reflection signal according to the emitted beams. The detected signal is output as a tracking error signal (TES) through a predetermined calculation process.

FIG. 1 is a view schematically illustrating optical paths during the reproduction of an optical disk having a multilayer structure according to a conventional technology. An effect by a reflection beam by an adjacent recording layer in a multilayer recording medium on the TES will be described with reference to FIG. 1. In FIG. 1, L0 and L1 denote recording layers of the multilayer recording medium.

Referring to FIG. 1, a beam emitted from a light source (not shown) passes through a diffraction grating (not shown) and is separated into a main beam M1 and two sub-beams S1 and S2. Then, the separated beams pass through a collimator lens 4 and an objective lens 1 and are emitted to the recording layer L1.

FIG. 2 is an enlarged view of a portion A of FIG. 1 and shows that the main beam M1 and two sub-beams S1 and S2 are emitted to the recording layer L1. Referring to FIG. 2, the main beam M1 is emitted to a track center TC formed on the recording layer L1 and the sub-beams S1 and S2 are emitted between a corresponding track and adjacent tracks.

The main beam M1 and the two sub-beams S1 and S2 are reflected from the recording layer L1 and received by a photodetector 5. Also, a partial beam M2 of the main beam M1 is reflected from the recording layer L0, not from the recording layer L1 that is being reproduced, and received by the photodetector 5.

FIG. 3 is an enlarged view of a portion B of FIG. 1 and shows beam spots formed by the main beam M1 and the two sub-beams S1 and S2 detected by the photodetector 5. FIG. 4 is a view schematically illustrating the distribution of light detected by the photodetector 5 during the reproduction of the recording layer L1. Referring to FIG. 3, the photodetector 5 includes a main photodetector (MPD) receiving a main spot 10 of the main beam M1 and sub-photodetectors SPD1 and SPD2 receiving sub-spots 11 and 12 of the sub-beams S1 and S2, respectively. The main photodetector MPD is horizontally and vertically divided into four sections. Each of the sub-photodetectors SPD1 and SPD2 is divided into two sections. Assuming that the output signals of the respective sections of the photodetectors are A, B, C, D, E, F, G, and H, the TES is generated by calculating these signals. The $TES_{DPP}$ that is detected in the DPP method is calculated by an equation that $TES_{DPP}=[(A+B)-(C+D)]-k[(E-F)+(G-H)]$.

Referring to FIG. 4, a beam spot 20 of the partial beam M2 of the main beam M1 that is reflected from the recording layer L0 and received by the photodetector 5 is larger than the main spot 10 reflected from the recording layer L1 that is actually reproduced. Thus, the beam spot 20 reflected from the recording layer L0 may cover the sub-spots 11 and 12. Considering that the ratio of the light amount between the main beam and the sub-beam is typically set to 10:1, when the beam spot 20 formed by the partial beam M2 of the main beam M1 overlaps at least a part of the sub-spots 11 and 12, the beam spot 20 may affect a push-pull signal using the sub-spots 11 and 12. The beam spot 20 formed by the partial beam M2 reflected from the recording layer L0 affects the symmetry between the sub-spots 11 and 12 so that a DC offset may be generated in the push-pull signal.

As described above, in the multilayer recording medium, when part of a beam reflected from a recording layer, different from a recording layer that is to be reproduced, is detected by a sub-photodetector, the partial beam may greatly affect a push-pull signal by a sub-beam.

Referring back to FIG. 1, to prevent the deterioration of a tracking signal caused by a beam reflected from an adjacent layer, it has been suggested to include an optical member 2 for diffracting part of the light reflected from the adjacent layer and a ¼ wavelength plate 3 for changing polarization of incident light. According to the above arrangement, since the light reflected from the adjacent layer is diffracted by using the optical member 2, tracking servo crosstalk due to the adjacent layer can be reduced. The above arrangement may weaken the influence of a reflection signal caused by the adjacent layer without much loss of an RF signal when the distance between the recording layers is relatively great as in the double layer recording medium.

However, since the distance between the recording layers decreases as the number of recording layers increases, in order to reduce the influence of the reflection signal caused by the adjacent layer, the size of the optical member 2 needs to be increased. The increased size of the optical member 2 accordingly increases the amount of light that is diffracted by the optical member 2 so that the loss of the beam received by the main photodetector may increase and a jitter characteristic may be deteriorated.

As described above, in the multilayer recording medium, when the beam reflected by the adjacent layer, other than the recording layer that is being recorded or reproduced, is received by the photodetector, in particular, when part of the main beam having a relatively greater light amount is reflected from the adjacent layer and affects the sub-photodetectors, the push-pull signal created by the sub-beam is difficult to determine and an offset may be generated in the push-pull signal. As a result, tracking by a tracking servo error signal becomes unstable and the recording and/or reproduction characteristics may be deteriorated.

SUMMARY OF THE INVENTION

To solve the above and/or other problems, an aspect of the present invention provides an optical pickup which can prevent deterioration of a tracking signal by reducing tracking servo crosstalk due to an adjacent layer in a multilayer recording medium.

According to another aspect of the present invention, there is provided a method of setting a distance between a main photodetector and a sub-photodetector so that tracking servo crosstalk due to a signal reflection from an adjacent layer can be prevented in a tracking servo control in a differential push-pull method.

According to another aspect of the present invention, there is provided a method of setting a distance between recording layers of a multilayer recording medium to reduce tracking servo crosstalk using the above optical pickup when the distance between the main photodetector and the sub-detector included in the optical pickup is set to a predetermined distance.

According to an aspect of the present invention, an optical pickup for recording and/or reproducing data with respect to a multilayer recording medium having a plurality of recording layers includes a light source emitting a beam having a predetermined wavelength, a diffraction unit separating the beam emitted from the light source into a main beam and a sub-beam, and a photodetector having a main photodetector detecting a main beam reflected from the multilayer recording medium and a sub-photodetector detecting the sub-beam, wherein the main photodetector and sub-photodetector are separated a predetermined distance from each other so that a beam spot formed by the beam reflected from a defocus recording layer is not detected by the sub-photodetector.

According to another aspect of the present invention, a distance Ds between the main photodetector and the sub-photodetector satisfies the following inequality:

$$D_s \geq \frac{A}{2} + QR,$$

wherein "R" is the radius of a beam spot formed by the beam reflected from the defocus recording layer, "A" is the width of the sub-photodetector, and "Q" is a coefficient indicating an allowable range of a DC offset of a sub-push-pull signal.

According to another aspect of the present invention, the radius R satisfies the following equation:

$$R = 2 \times \frac{d_{sp}}{n_{sp}} \times M \times NA,$$

wherein, "$d_{sp}$" is the thickness of a spacer layer between the defocus recording layer and a recording layer that is subject to recording and/or reproduction, "$n_{sp}$" is the refractive index of the spacer layer, "M" is the magnifying power of the optical pickup, and "NA" is the numerical aperture of an objective lens used for the optical pickup.

According to another aspect of the present invention, the coefficient Q is between 0.85-0.90 when the allowable range of the DC offset is not more than 5%.

According to another aspect of the present invention, the main photodetector is a four-section photodetector while the sub-photodetector is a two-section photodetector.

According to another aspect of the present invention, the optical pickup further includes a calculation portion calculating signals detected by the main photodetector and sub-photodetector and outputting a differential push-pull signal.

According to another aspect of the present invention, there is provided a method of setting an optical pickup including a light source emitting a beam having a predetermined wavelength, a diffraction unit separating the beam emitted from the light source into a main beam and a sub-beam, and a photodetector having a main photodetector detecting a main beam reflected from the multilayer recording medium and a sub-photodetector detecting the sub-beam, the method including setting a distance Ds between the main photodetector and the sub-photodetector to satisfy the following inequality, to prevent a beam spot formed by the main beam from being detected by the sub-photodetector, $$D_s \geq \frac{A}{2} + QR,$$

wherein "R" is the radius of a beam spot formed by the beam reflected from the defocus recording layer, "A" is the width of the sub-photodetector, and "Q" is a coefficient indicating an allowable range of a DC offset of a sub-push-pull signal.

According to another aspect of the present invention, the radius R satisfies the following equation:

$$R = 2 \times \frac{d_{sp}}{n_{sp}} \times M \times NA,$$

wherein, "$d_{sp}$" is the thickness of a spacer layer between the defocus recording layer and a recording layer that is subject to recording and/or reproduction, "$n_{sp}$" is the refractive index of the spacer layer, "M" is the magnifying power of the optical pickup, and "NA" is the numerical aperture of an objective lens used for the optical pickup.

According to another aspect of the present invention, the coefficient Q is between 0.85-0.90 when the allowable range of the DC offset is not more than 5%.

According to yet another aspect of the present invention, there is provided a multilayer recording medium and an optical pickup, wherein, when a distance between a main photodetector and a sub-photodetector is Ds, the distance Ds satisfies the following inequality:

$$d_{sp} \leq \frac{\left(D_s - \frac{A}{2}\right) \times n_{sp}}{2Q \times M \times NA},$$

wherein "A" is the width of the sub-photodetector, "Q" is a coefficient indicating an allowable range of a DC offset of a sub-push-pull signal, "$n_{sp}$" is the refractive index of a spacer layer between recording layers of a multilayer recording medium, "M" is the magnifying power of the optical pickup, and "NA" is the numerical aperture of an objective lens used in the optical pickup.

According to another aspect of the present invention, the coefficient Q is between 0.85-0.90 when the allowable range of the DC offset is not more than 5%.

According to another aspect of the present invention, the optical pickup performs a tracking servo control using a differential push-pull method.

Additional aspects and/or advantages of the invention will be set forth in part in the description which follows and, in part, will be obvious from the description, or may be learned by practice of the invention.

BRIEF DESCRIPTION OF THE DRAWINGS

These and/or other aspects and advantages of the invention will become apparent and more readily appreciated from the following description of the embodiments, taken in conjunction with the accompanying drawings of which.

DETAILED DESCRIPTION OF THE EMBODIMENTS

Figure 1:
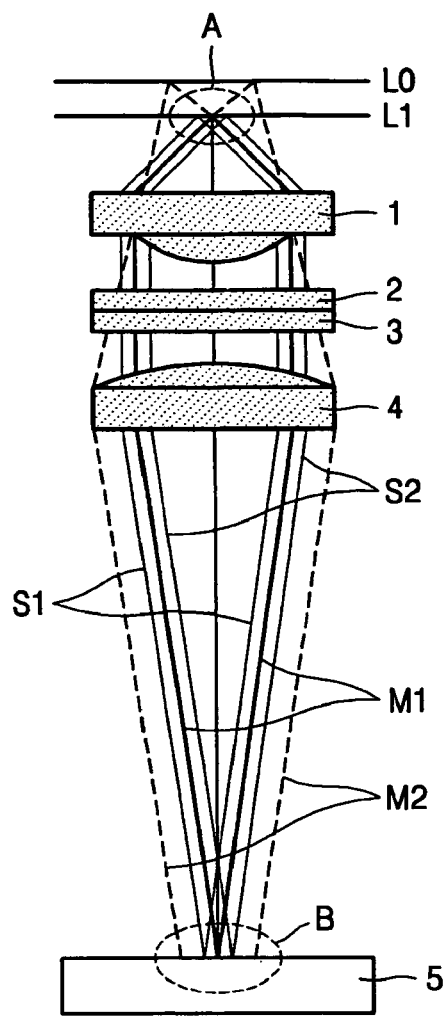
FIG. 1 is a view schematically illustrating optical paths during the reproduction of an optical disk having a multilayer structure according to a conventional technology.
Figure 2:
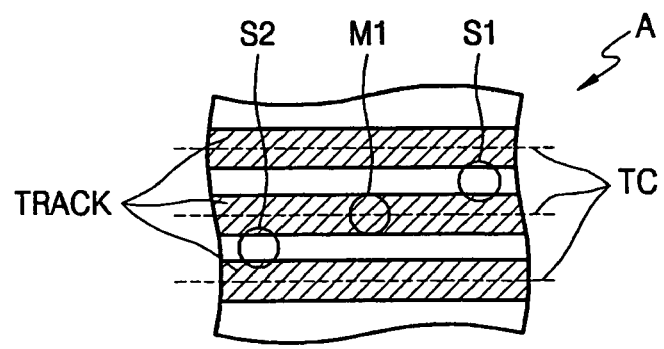
FIG. 2 is an enlarged view of a portion A of FIG. 1.
Figure 3:
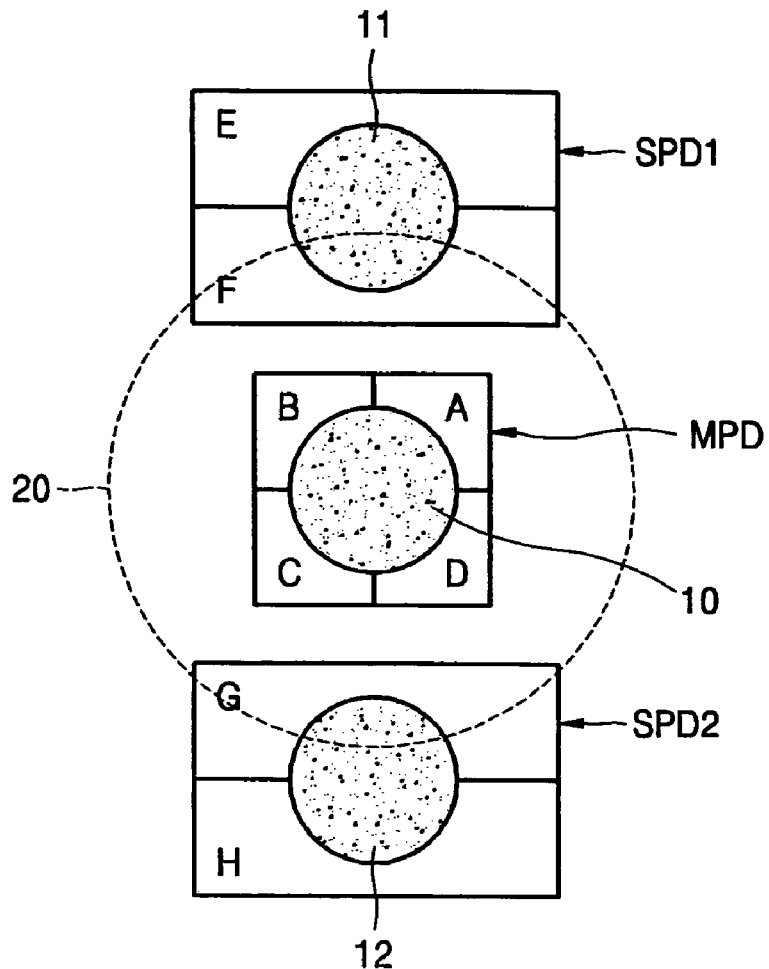
FIG. 3 is an enlarged view of a portion B of FIG. 1.
Figure 4:
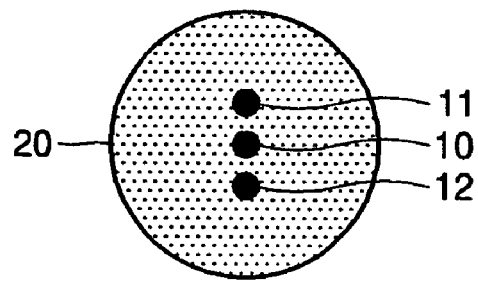
FIG. 4 is a view schematically illustrating the distribution of light detected by a photodetector during the reproduction of a recording layer L1 of FIG. 1.

Reference will now be made in detail to the present embodiments of the present invention, examples of which are illustrated in the accompanying drawings, wherein like reference numerals refer to the like elements throughout. The embodiments are described below in order to explain the present invention by referring to the figures.

The terms used in the description of the present invention are defined as follows.

A "defocus recording layer" denotes one of a plurality of recording layers in a multilayer recording medium, except for a recording layer that is being recorded and/or reproduced, from which a beam emitted on the multilayer recording medium is reflected.

A "defocus beam" denotes a beam reflected from the defocus recording layer and detected by a photodetector.

A "defocus spot" denotes a beam spot formed by the defocus beam on the photodetector.

Figure 5:
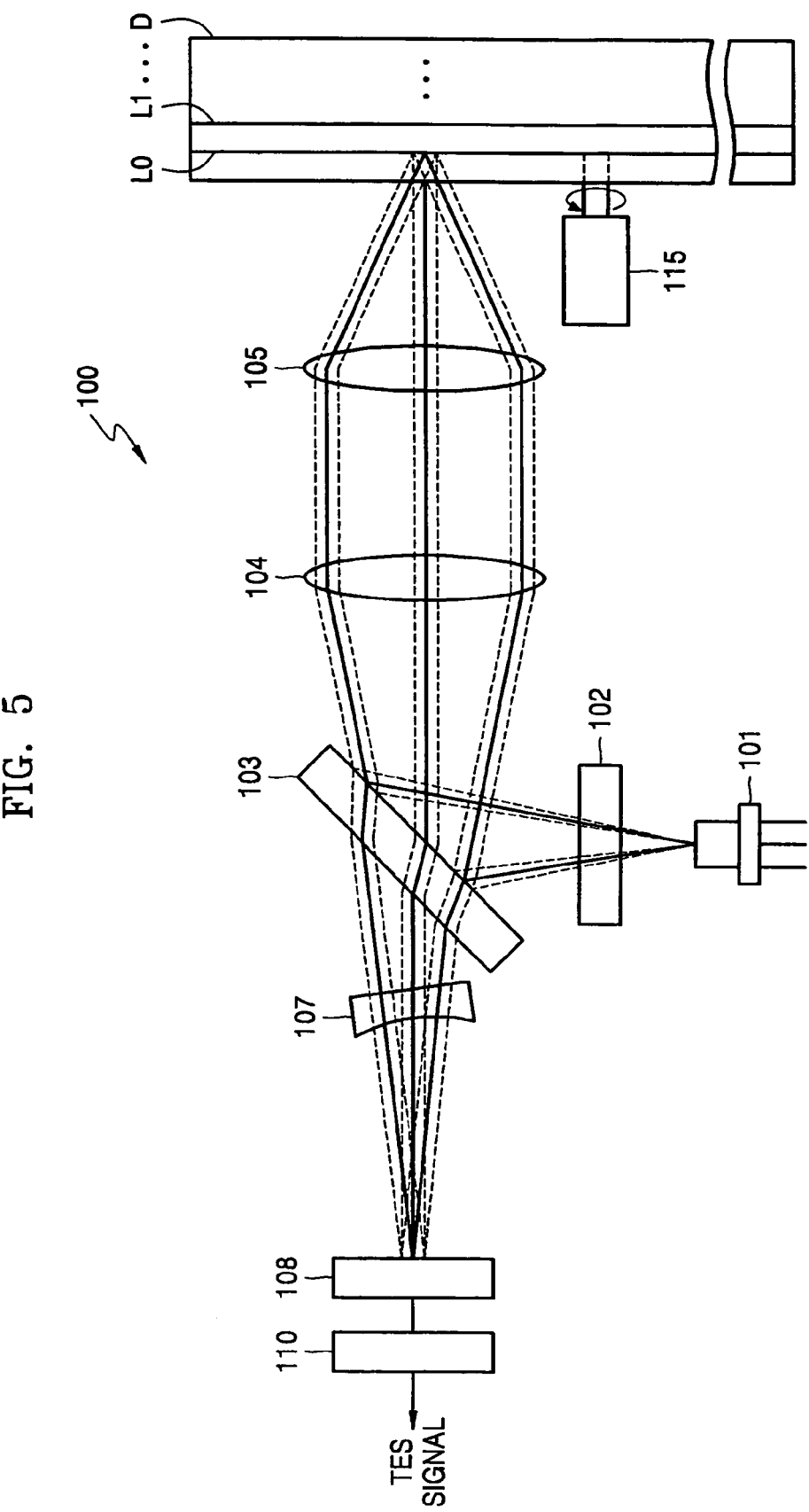
FIG. 5 is a view schematically illustrating the configuration of an optical pickup according to an embodiment of the present invention.

FIG. 5 is a view schematically illustrating the configuration of an optical pickup 100 according to an embodiment of the present invention. Referring to FIG. 5, the optical pickup 100 includes a light source 101, a diffraction grating 102, a beam splitter 103, a collimator lens 104, an objective lens 105, a concave lens 107, a photodetector 108, a calculation portion 110, and a drive unit 115.

The light source 101 includes a laser diode to emit a beam in a range of a predetermined wavelength. For example, the light source 101 can be configured to emit a beam in a blue wavelength range, that is, a beam having a 405 nm wavelength, satisfying the advanced optical disc (AOD) and Blu-ray disc (BD) standards. The optical pickup 100 uses a differential push-pull (DPP) method for tracking servo control. For the DPP method, the diffraction grating 102 separates the beam emitted from the light source 101 into a single main beam and two sub-beams.

The proceeding directions of the separated beams are changed by the beam splitter 103 to proceed toward a multilayer recording medium D. The collimator lens 104 converts the beams in a divergent form into parallel beams to be incident on the objective lens 105.

The objective lens 105 focuses the beams on a recording layer of the multilayer recording medium to be recorded and/or reproduced. The objective lens 105 has a high NA of about 0.85 satisfying the BD standard. FIG. 5 shows a case in which a recording layer L0 from the recording layers in the multilayer recording medium is subject to recording and/or reproduction.

The main beam and sub-beams reflected from the multilayer recording medium D are focused on the photodetector 108 by the concave lens 107. The calculation portion 110 performs a predetermined calculation using a signal detected by the photodetector 108 and generates and outputs a tracking error signal (TES). The drive unit 115 rotates the multilayer recording medium D, for which a spindle motor can be used.

When the light source 101 emits light having a wavelength of 405 nm in a blue wavelength range and the objective lens 105 has a 0.85 NA, the optical pickup 100 according to an embodiment of the present invention is proper for the recording and/or reproduction of a multilayer recording medium satisfying the BD standard. Also, when the optical pickup 100 according to an embodiment of the present invention is used with a multilayer recording medium having a plurality of recording layers and satisfying a DVD standard, the light source 101 emits light having a wavelength of 650 nm in a red wavelength range and the objective lens 105 has a 0.65 NA suitable for a DVD. The optical pickup 100 according to an embodiment of the present invention can be used with other multilayer recording media satisfying different standards by adjusting the wavelength of the light source 105 and the NA of the objective lens 105 according to the standard of a recording medium in use.

Figure 6:
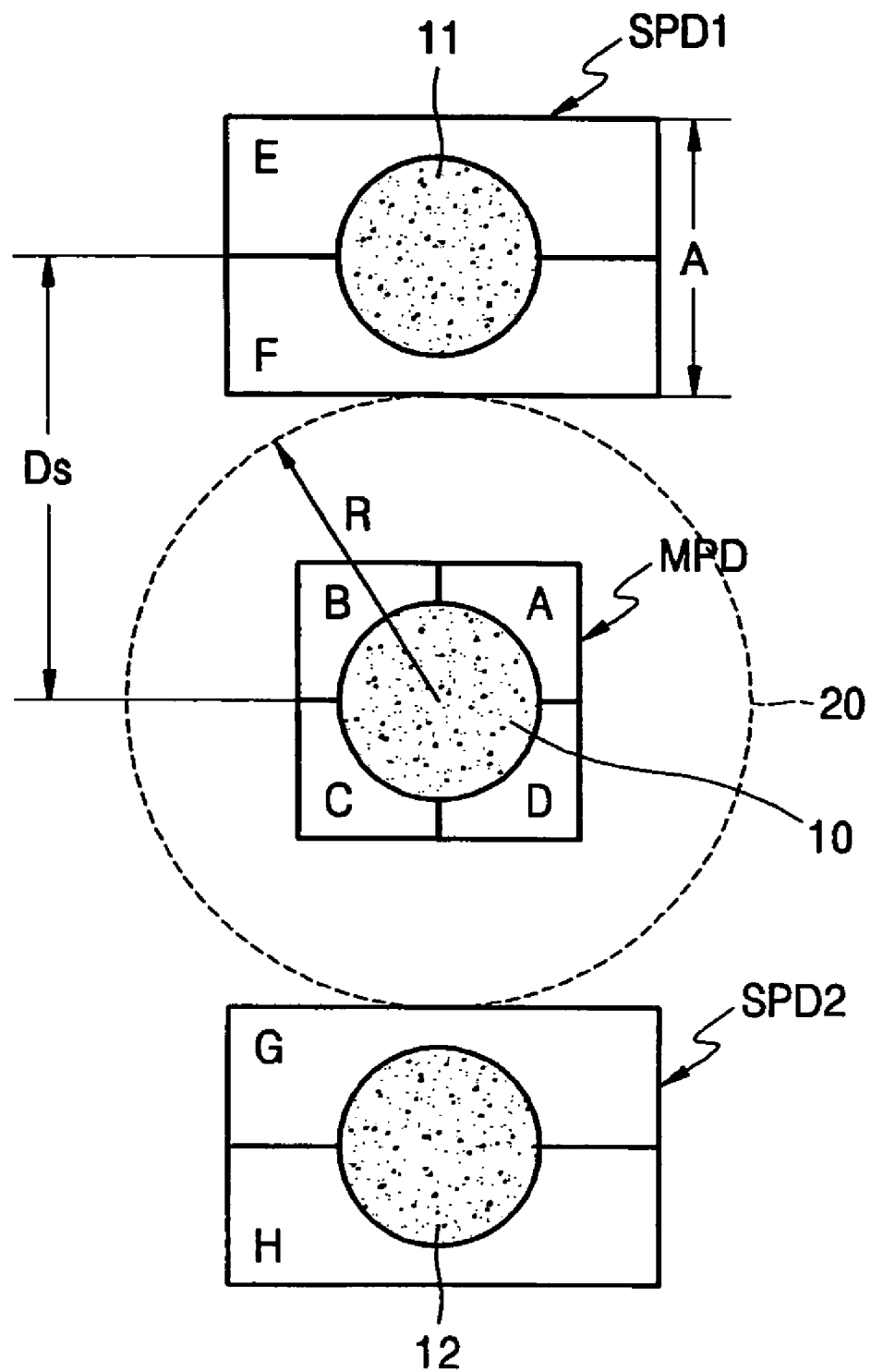
FIG. 6 is a view illustrating the configuration of a photodetector used in the optical pickup of FIG. 5.
Figure 7:
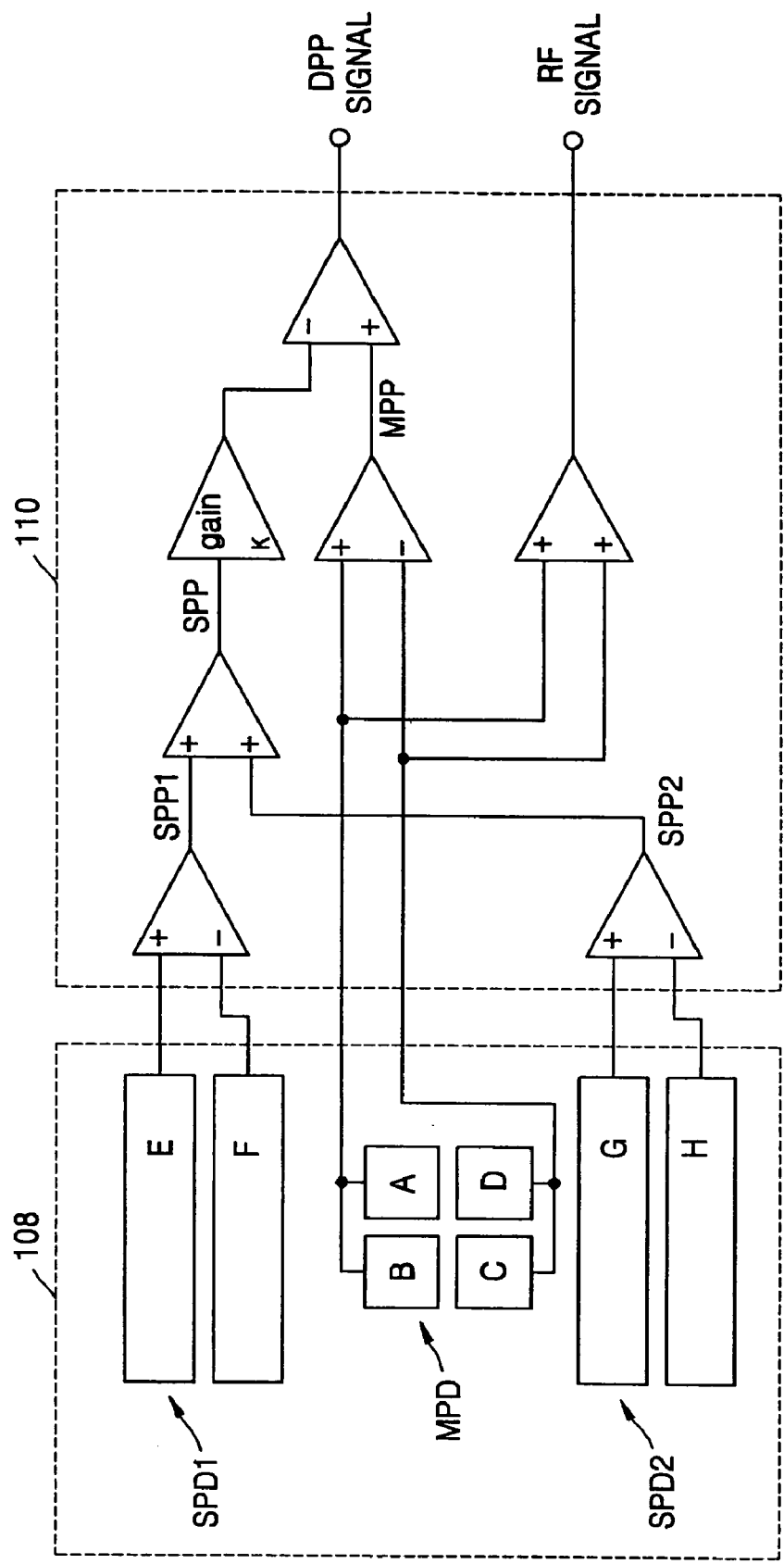
FIG. 7 is a view illustrating the configuration of a calculation portion used in the optical pickup of FIG. 5.

FIG. 6 is a view illustrating the configuration of the photodetector 108 used in the optical pickup 100 of FIG. 5. FIG. 7 is a view illustrating the configuration of the calculation portion 110 used in the optical pickup 100 of FIG. 5. Referring to FIG. 6, the photodetector 108 according to an embodiment of the present invention includes a main photodetector MPD detecting a main spot 10 of the main beam and first and second sub-photodetectors SPD1 and SPD2 detecting sub-spots 11 and 12 of the two sub-beams.

The main photodetector MPD is divided into two sections in a radial direction R and a tangential direction T of the multilayer recording medium to facilitate detection of a focus error signal and/or the TES. That is, the main photodetector MPD has at least a four-section structure. FIG. 6 shows an example of the main photodetector MPD having a four-section structure by being divided into two sections in the direction R and two sections in the direction T.

Each of the first and second sub-photodetectors SPD1 and SPD2 is divided into two sections in the direction R to facilitate the detection of the TES in the DPP method. Assuming that the respective light receiving areas of the main photodetector MPD are A, B, C, and D, the respective light receiving areas of the first and second sub-photodetector SPD1 are E and F, and the respective light receiving areas of the sub-photodetector SPD2 are G and H, the calculation portion 110 calculates signals detected from the light receiving areas A through H and outputs a sub-push-pull signal SPP and a differential push-pull signal DPP as described below.

Referring to FIG. 7, a difference between the signals detected from the light receiving areas E and F of the first sub-photodetector SPD1, that is, E-F, is output as a first sub-push-pull signal SPP1. Likewise, a difference between the signals detected from the light receiving areas G and H of the second sub-photodetector SPD2, that is, G-H, is output as a second sub-push-pull signal SPP2. The first and second sub-push-pull signals are added and output as the sub-push-pull signal SPP.

The signal detected from the light receiving areas A, B, C, and D of the main photodetector MPD is output as the main push-pull signal MPP after the calculation "(A+B)–(C+D)". Further, an RF signal is generated by adding the signals detected from the light receiving areas A through D, that is, A+B+C+D.

A differential push-pull signal DPP is obtained by subtracting the sub-push-pull signal SPP multiplied by a predetermined gain k, from the main push-pull signal MPP. That is, the TES in the DPP method is as follows: $TES_{DPP} = [(A+B)–(C+D)]–k[(E–F)+(G–H)]$.

According to the conventional technology, since the main photodetector MPD and the sub-photodetectors SPD1 and SPD2 are not sufficiently separated, a beam reflected from the defocus recording layer, that is, a recording layer adjacent to a recording layer that is subject to recording and/or reproduction can be detected by the first and second sub-photodetectors SPD1 and SPD2. For example, when predetermined data is recorded and/or reproduced with respect to the recording layer L0 of FIG. 5, a beam reflected from the recording layer L1 that is adjacent to the recording layer L0 can be detected by the photodetectors.

However, in the DPP method, the sub-push-pull signal is very sensitive to the beam reflected from the adjacent layer because the amount of light of the sub-spot is relatively smaller than that of the main spot 10. Thus, when the focus of a beam emitted for tracking is deviated or the main beam is reflected from the defocus recording layer and detected by the sub-photodetectors SPD1 and SPD2 due to a slight change in the thickness between the recording layers, the push-pull signal is greatly affected. That is, when a difference in the amount of light is generated by the defocus spot 20 detected by the sub-photodetectors SPD1 and SPD2 as the defocus spot 20 is not disposed at the center of the main photodetector MPP, a predetermined offset is generated in the sub-push-pull signal SPP, that is, (E–F)+(G–H), so that tracking servo control using the TES becomes unstable.

Therefore, to stabilize the sub-push-pull signal detected by the sub-photodetectors SPD1 and SPD2, the main photodetector MPD and the sub-photodetectors SPD1 and SPD2 need to be separated a predetermined distance from one another such that the defocus spot 20 having a relatively large diameter is not detected by the sub-photodetectors SPD1 and SPD2 or, even if part of the defocus spot 20 is detected by the sub-photodetectors, the amount of light of the defocus spot 20 does not affect the push-pull signal.

The photodetector 108 is characteristic in that the main photodetector MPD and the sub-photodetectors SPD1 and SPD2 are separated a predetermined distance from one another to prevent the defocus spot 20 formed by the beam reflected from the defocus recording layer adjacent to a recording layer that is subject to recording and/or reproduction, from being detected by the sub-photodetectors SPD1 and SPD2.

Referring back to FIG. 6, assuming that the radius of the defocus spot 20 is R and the widths of the sub-photodetectors SPD1 and SDP2 are A, to prevent the defocus spot 20 from affecting the sub-photodetectors SPD1 and SPD2, the distance Ds between the main photodetector MPD and each of the sub-photodetectors SPD1 and SPD2 must satisfy the following Inequality 1.

$$D_s \geq \frac{A}{2} + QR \qquad \text{[Inequality 1]}$$

Here, "Q" is the detection allowance coefficient considering an allowable arrangement of a DC offset by the defocus spot 20, which indicates how much the detection of the light amount of the defocus spot 20 is allowed in the sub-photodetectors SPD1 and SPD2. When a DC offset under about 5% is allowed in the sub-push-pull signal SPP, the detection allowance coefficient Q has a value between 0.85–0.90.

The radius R of the defocus spot 20 in Inequality 1 is the same as that in the following Equation 2.

$$R = 2 \times \frac{d_{sp}}{n_{sp}} \times M \times NA \qquad \text{[Equation 2]}$$

Here, "$d_{sp}$" is the thickness of a spacer layer between the defocus recording layer and the recording layer that is subject to recording and/or reproduction, "$n_{sp}$" is the refractive index of the spacer layer, "M" is the magnifying power of the optical pickup, and "NA" is the numerical aperture of an objective lens used for the optical pickup.

Figure 8:
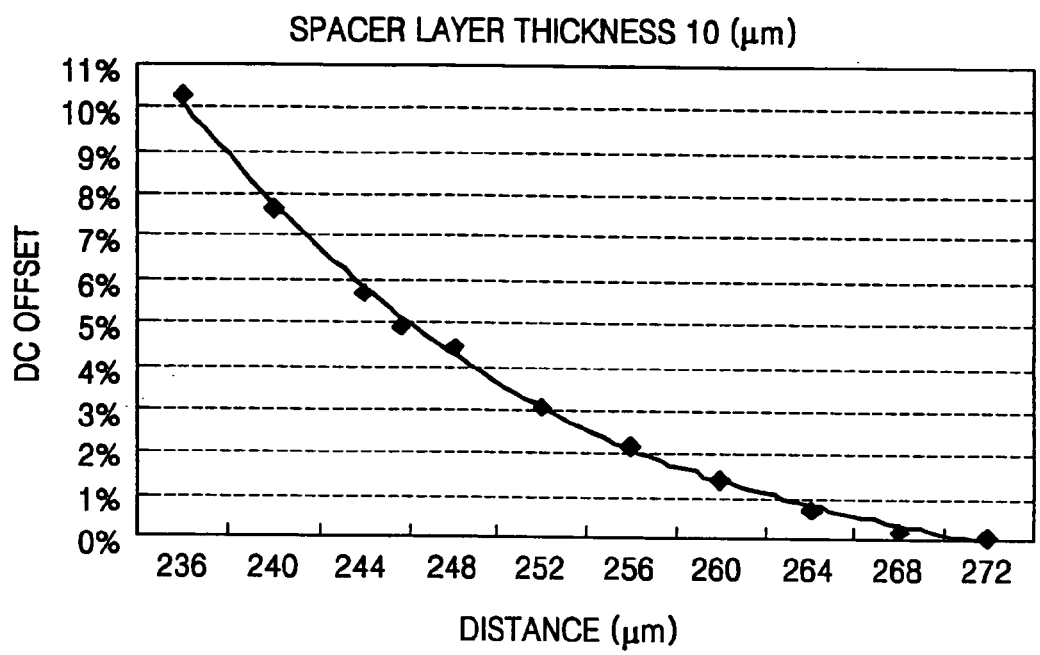
FIGS. 8 through 10 are graphs showing a DC offset of a sub-push-pull signal according to the change in the distance between a main photodetector MPD and each of the sub-photodetectors SPD1 and SPD2 when the thickness of a spacer layer in a multilayer recording medium is 10 μm, 12 μm, and 14 μm, respectively.
Figure 9:
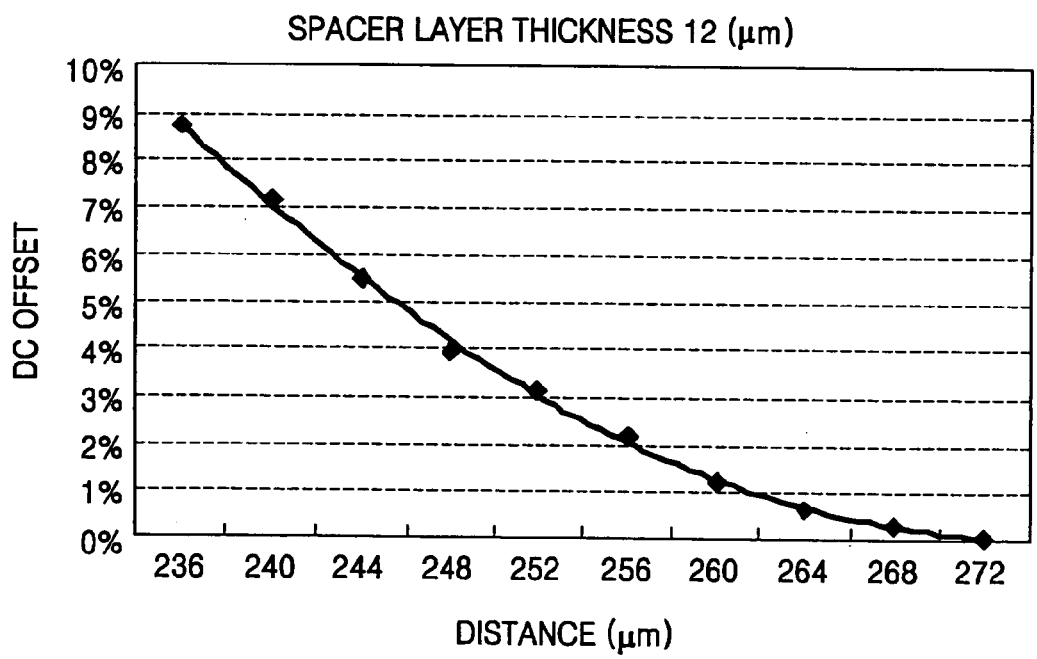
Figure 10:
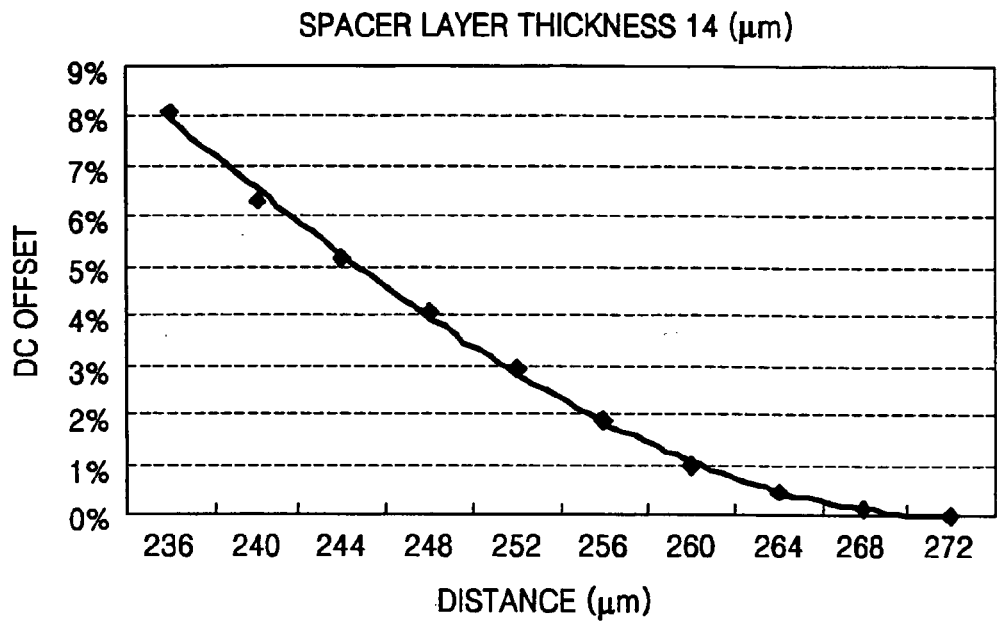

FIGS. 8 through 10 are graphs showing a DC offset of a sub-push-pull signal according to the change in the distance between the main photodetector MPD and each of the sub-photodetectors SPD1 and SPD2 when the thickness of a spacer layer in a multilayer recording medium is 10 μm, 12 μm, and 14 μm, respectively. Referring to FIGS. 8 through 10, the DC offset of the sub-push-pull signal decreases as the distance between the main photodetector MPD and each of the sub-photodetectors SPD1 and SPD2 increases. Thus, in the optical pickup according to an embodiment of the present invention, when a DC offset of a predetermined amount is required, the distance between the main photodetector MPD and each of the sub-photodetectors SPD1 and SPD2 is appropriately set considering the change in the DC offset of the sub-push-pull signal according to the distance between the main photodetector MPD and each of the sub-photodetectors SPD1 and SPD2. For example, when the thickness of the spacer layer is 10 μm and the DC offset of under about 5% is requested, as shown in FIG. 8, the distance between the main photodetector MPD and each of the sub-photodetectors SPD1 and SPD2 is set to be at least 244 μm.

Figure 11:
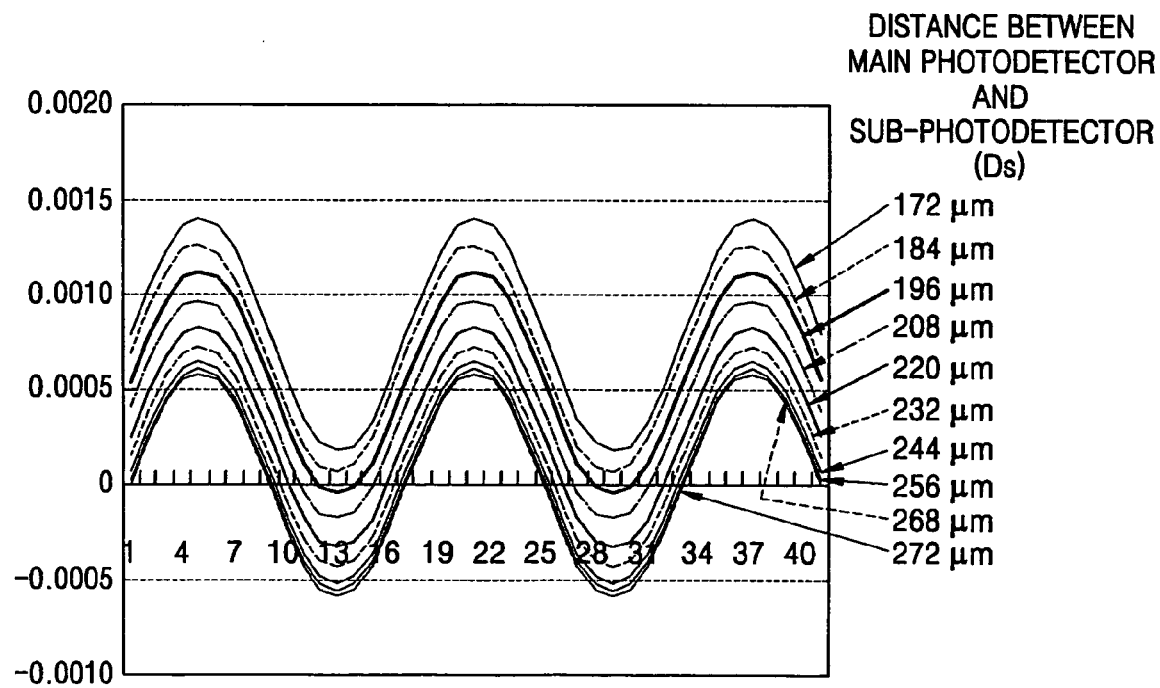
FIG. 11 is a graph showing a change in the waveform of the sub-push-pull signal detected during the reproduction of a multilayer recording medium according to the change in the distance Ds between the main photodetector and the sub-photodetector of the optical pickup of FIG. 5.

FIG. 11 is a graph showing a change in the waveform of the sub-push-pull signal detected during the reproduction of a multilayer recording medium according to the change in the distance Ds between the main photodetector and each of the sub-photodetectors of the optical pickup of FIG. 5. Here, the x axis represents time while the y axis represents the size of the sub-push-pull signal. The interval between the recording layers of the multilayer recording medium is set to 10 μm. Referring to FIG. 11, the distance Ds between the main photodetector MPD and each of the sub-photodetectors SPD1 and SPD2 gradually increases from 172 μm to 272 μm, so that the average of the sub-push-pull, that is, the DC offset, gradually decreases. However, the distance Ds between the main photodetector MPD and each of the sub-photodetectors SPD1 and SPD2 needs to be increased within an appropriate range considering the size of an optical head.

Figure 12:
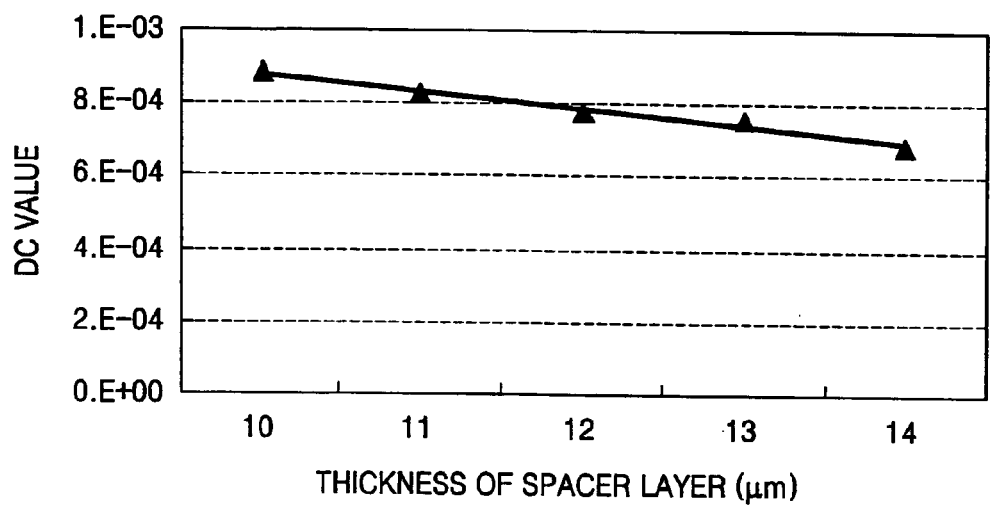
FIG. 12 is a graph showing a change in the DC value of a defocus beam according to the change in the thickness of a spacer layer of the multilayer recording medium according to an embodiment of the present invention.

FIG. 12 is a graph showing a change in the DC value of the defocus beam according to the change in the thickness of the spacer layer of the multilayer recording medium according to an embodiment of the present invention. Referring to FIG. 12, the DC value of the defocus beam detected by the sub-photodetectors SPD1 and SPD2 gradually decreases as the thickness of the spacer layer increases from 10 μm to 14 μm. In general, since the thickness of the spacer layer has a small size between 10-14 μm, as the number of the recording layers provided in the multilayer recording medium increases, the DC value of the defocus beam which causes the DC offset of the sub-push-pull signal in the optical pickup for recording and/or reproducing data with respect to the multilayer recording medium must be taken into consideration.

Figure 13:
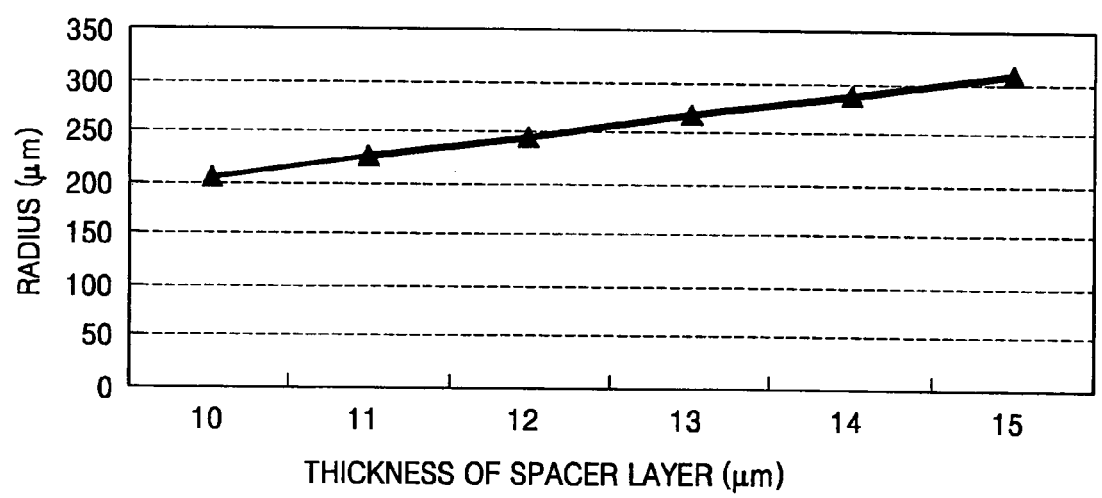
FIG. 13 is a graph showing a change in the radius R of a defocus spot according to the change in the thickness of the spacer layer of the multilayer recording medium according to the embodiment of the present invention.

FIG. 13 is a graph showing a change in the radius R of the defocus spot according to the change in the thickness of the spacer layer of the multilayer recording medium according to the embodiment of the present invention. Referring to FIG. 13, as the thickness of the spacer layer increases, the radius of the defocus spot gradually increases in proportion thereto.

As described above, since the DC value and size of the defocus beam detected by the sub-photodetectors SPD1 and SPD2 according to the change in the thickness of the spacer layer of the multilayer recording medium change, the DC value and size of the defocus beam must be taken into consideration when the distance Ds between the main photodetector MPD and each of the sub-photodetectors SPD1 and SPD2 is determined.

When the distance Ds between the main photodetector MPD and each of the sub-photodetectors SPD1 and SPD2 is determined, the thickness $d_{sp}$ of the spacer layer of the multilayer recording medium can be set to prevent crosstalk of a tracking error signal by the adjacent layer. That is, when the thickness $d_{sp}$ of the spacer layer of the multilayer recoding medium is calculated using Inequality 1 and Equation 2, the following Inequality 3 is obtained.

$$d_{sp} \leq \frac{\left(D_s - \frac{A}{2}\right) \times n_{sp}}{2Q \times M \times NA} \qquad [\text{Inequality 3}]$$

As described above, the detection allowance coefficient Q is determined considering the range of the DC offset of the sub-push-pull that is allowed. For example, when the DC offset of about 5% is allowed, the detection allowance coefficient Q has a range between 0.85-0.90.

The optical pickup according to an embodiment of the present invention can be used to prevent crosstalk due to the beam reflected from the adjacent layer when a radial tilt signal is detected in the multilayer recording medium.

While this invention has been particularly shown and described with reference to embodiments thereof, it will be understood by those skilled in the art that various changes in form and details may be made therein without departing from the spirit and scope of the invention as defined by the appended claims.

As described above, according to an embodiment of the present invention, the deterioration of the tracking error signal due to the crosstalk by the beam reflected from the adjacent layer during the recording and/or reproduction of data with respect to the multilayer recording medium is prevented so that a more stable tracking servo control is possible. Also, since a stable tracking error signal can be detected without loss of an RF signal, a jitter characteristic is improved.

Although a few embodiments of the present invention have been shown and described, it would be appreciated by those skilled in the art that changes may be made in this embodiment without departing from the principles and spirit of the invention, the scope of which is defined in the claims and their equivalents.

What is claimed is:

1. An optical pickup for recording and/or reproducing data with respect to a multilayer recording medium having a plurality of recording layers, the optical pickup comprising:

a light source emitting a beam having a predetermined wavelength;

a diffraction unit separating the beam emitted from the light source into a main beam and a sub-beam; and a photo-detector having a main photodetector, detecting the main beam reflected from the multilayer recording medium, and a sub-photodetector detecting the sub-beam, wherein the main photodetector and the sub-photodetector are separated a predetermined distance Ds from each other so that a beam spot formed by the beam reflected from a defocus recording layer of the multilayer recording medium is not detected by the sub-photodetector, and wherein the predetermined distance Ds between the main photodetector and the sub-photodetector satisfies the following inequality:

$$D_s \geq A/2 + QR$$

wherein "R" is a radius of the beam spot formed by the beam reflected from the defocus recording layer, "A" is a width of the sub-photodetector, and "Q" is a coefficient indicating an allowable range of a DC offset of a sub-push-pull signal, and wherein the coefficient Q is between 0.85-0.90 when the allowable range of the DC offset is not more than 5%.

2. The optical pickup as claimed in claim 1, wherein the radius R satisfies the following equation:

$$R = 2 \times \frac{d_{sp}}{n_{sp}} \times M \times NA,$$

wherein, "$d_{sp}$" is a thickness of a spacer layer between the defocus recording layer and a recording layer that is subject to recording and/or reproduction, "$n_{sp}$" is a refractive index of the spacer layer, "M" is a magnifying power of the optical pickup, and "NA" is a numerical aperture of an objective lens used in the optical pickup.

3. The optical pickup as claimed in claim 1, wherein the main photodetector is a four-section photodetector.

4. The optical pickup as claimed in claim 1, wherein the sub-photodetector is a two-section photodetector.

5. The optical pickup as claimed in claim 1, further comprising a calculation portion calculating signals detected by the main photodetector and the sub-photodetector and outputting a differential push-pull signal.

6. A method of setting an optical pickup including a light source emitting a beam having a predetermined wavelength, a diffraction unit separating the beam emitted from the light source into a main beam and a sub-beam, and a photodetector having a main photodetector, detecting the main beam reflected from a multilayer recording medium, and a sub-photodetector detecting the sub-beam, the method comprising:

setting a distance Ds between the main photodetector and the sub-photodetector to satisfy the following inequality, to prevent a beam spot formed by the main beam from being detected by the sub-photodetector:

$$D_s \geq \frac{A}{2} + QR,$$

wherein "R" is a radius of the beam spot formed by the beam reflected from a defocus recording layer, "A" is a width of the sub-photodetector, and "Q" is a coefficient indicating an allowable range of a DC offset of a sub-push-pull signal, and wherein the coefficient Q is between 0.85-0.90 when the allowable range of the DC offset is not more than 5%.

7. The method as claimed in claim 6, wherein the radius R satisfies the following equation:

$$R = 2 \times \frac{d_{sp}}{n_{sp}} \times M \times NA,$$

wherein, "$d_{sp}$" is a thickness of a spacer layer between the defocus recording layer and a recording layer that is subject to recording and/or reproduction, "$n_{sp}$" is a refractive index of the spacer layer, "M" is a magnifying power of the optical pickup, and "NA" is a numerical aperture of an objective lens used in the optical pickup.

8. An optical pickup for use with a multilayer recording medium having a plurality of recording layers that are subject to recording and/or reproduction, the optical pickup comprising:

a photodetector having a main photodetector and a sub-photodetector, wherein, when a distance between the main photodetector and the sub-photodetector is Ds, the distance Ds satisfies the following inequality:

$$d_{sp} \leq \frac{\left(D_s - \frac{A}{2}\right) \times n_{sp}}{2Q \times M \times NA},$$

wherein "A" is a width of the sub-photodetector, "Q" is a coefficient indicating an allowable range of a DC offset of a sub-push-pull signal, "$n_{sp}$" is a refractive index of a spacer layer between the plurality of recording layers, "M" is a magnifying power of the optical pickup, and "NA" is a numerical aperture of an objective lens used for the optical pickup.

9. The optical pickup as claimed in claim 8, wherein the coefficient Q is between 0.85-0.90 when the allowable range of the DC offset is not more than 5%.

10. The optical pickup as claimed in claim 8, wherein the optical pickup performs a tracking servo control using a differential push-pull method.

11. The optical pickup as claimed in claim 9, wherein the coefficient indicating the allowable range of the DC offset is determined based on the range of the DC offset of the sub-push-pull signal.

12. The optical pickup as claimed in claim 1, wherein the light source is configured to emit a beam in a blue wavelength range.

13. The optical pickup as claimed in claim 1, wherein the optical pickup uses a differential push-pull (DPP) method for tracking servo control.

14. The optical pickup as claimed in claim 2, wherein the numerical aperture of the objective lens is approximately 0.85.

15. The method of claim 6, comprising detecting a radial tilt signal from the multilayer recording medium, preventing crosstalk created by the beam reflected from the defocus layer.

16. An optical pickup for recording and/or reproducing data with respect to a multilayer recording medium having a plurality of recording layers, the optical pickup comprising:

a light source emitting a beam having a predetermined wavelength;

a diffraction unit separating the beam emitted from the light source into a main beam and at least one sub-beam; and a photodetector having a main photodetector, detecting the main beam reflected from the multilayer recording medium, and at least one sub-photodetector detecting the at least one sub-beam, wherein the main photodetector and the at least one sub-photodetector are separated a predetermined distance from one another preventing a defocus spot, formed by the beam reflected by a defocus recording layer adjacent to a recording layer that is subject to recording and/or reproduction, from being detected by the at least one sub-photodetector, and wherein an outer border of the defocus spot is tangential to an outer area of the sub photodetector that is not contacted by the sub-beam, and wherein the predetermined distance between the main photodetector and the at least on sub-photodetector satisfies the following inequality:

$$D_s \geq A/2 - QR$$

wherein "R" is a radius of the beam spot formed by the beam reflected from the defocus recording layer, "A" is a width of the sub-photodetector, and "Q" is a coefficient indicating an allowable range of a DC offset of a sub-push-pull signal, and wherein the coefficient Q is between 0.85-0.90 when the allowable range of the DC offset is not more than 5%.

17. The optical pickup as claimed in claim 16, wherein the radius R of the beam spot satisfies the following equation:

$$R = 2 \times \frac{d_{sp}}{n_{sp}} \times M \times NA,$$

wherein, "$d_{sp}$" is a thickness of a spacer layer between the defocus recording layer and a recording layer that is subject to recording and/or reproduction, "$n_{sp}$" is z refractive index of the spacer layer, "M" is z magnifying power of the optical pickup, and "NA" is z numerical aperture of an objective lens used in the optical pickup.

18. The optical pickup as claimed in claim 16, wherein the DC offset of the sub-push-pull signal decreases as the predetermined distance between the main photodetector and the at least one sub-photodetector increases.

* * * * *

UNITED STATES PATENT AND TRADEMARK OFFICE
CERTIFICATE OF CORRECTION

PATENT NO. : 7,298,675 B2  
APPLICATION NO. : 11/227912  
DATED : November 20, 2007  
INVENTOR(S) : Tao Hong et al.

It is certified that error appears in the above-identified patent and that said Letters Patent is hereby corrected as shown below:

Column 13, line 21, change "$D_s \geq A/2 - QR$" to -- $D_s \geq \dfrac{A}{2} + QR$ --.

Signed and Sealed this

First Day of April, 2008

JON W. DUDAS  
*Director of the United States Patent and Trademark Office*